W. T. HEAPS & W. THACKERAY.
BROADCAST SEEDER.
APPLICATION FILED MAR. 15, 1916.
1,189,105.
Patented June 27, 1916.
2 SHEETS—SHEET 1.
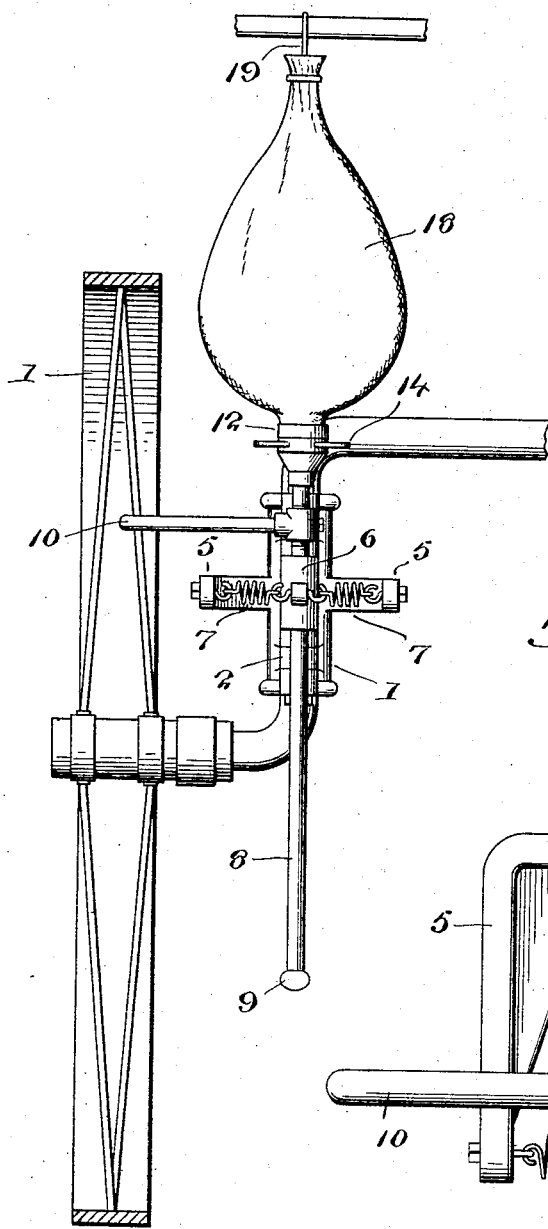
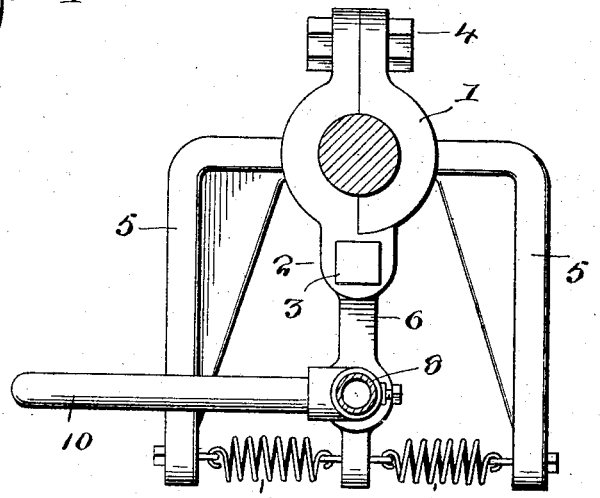
Inventors
Warren T. Heaps
William Thackeray
By Victor J. Evans
Attorney

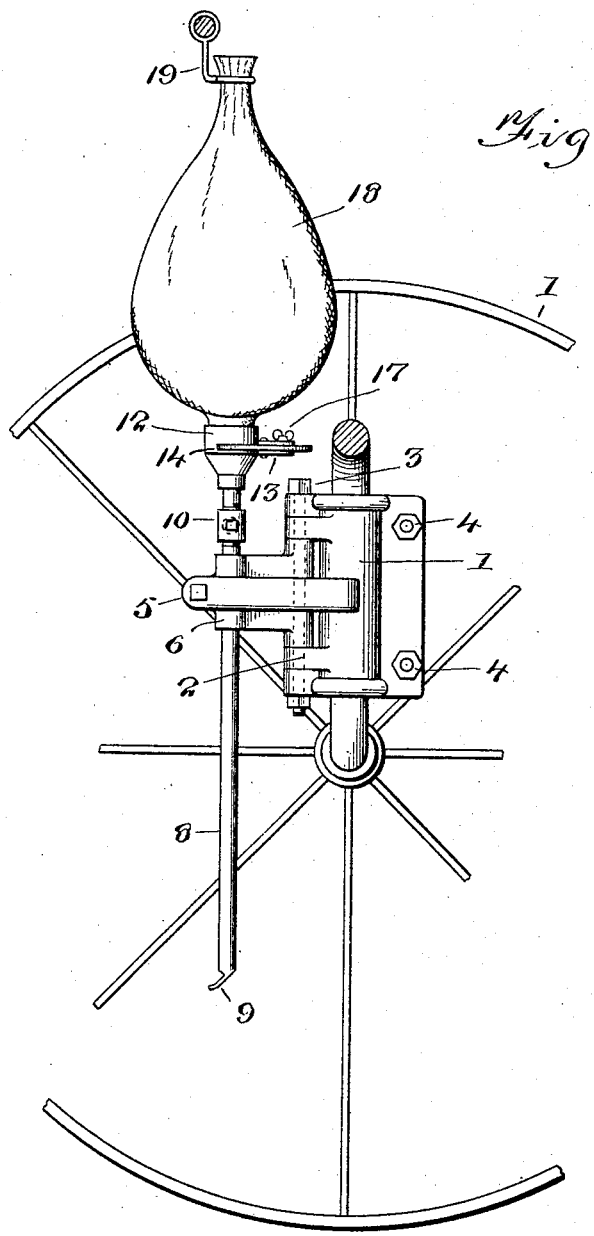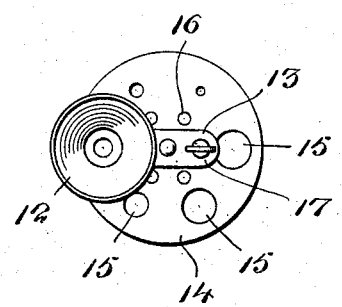

UNITED STATES PATENT OFFICE.

WARREN T. HEAPS AND WILLIAM THACKERAY, OF KEWANEE, ILLINOIS.

BROADCAST SEEDER.

1,189,105.  Specification of Letters Patent.  Patented June 27, 1916.

Application filed March 15, 1916. Serial No. 84,486.

*To all whom it may concern:*

Be it known that we, WARREN T. HEAPS and WILLIAM THACKERAY, citizens of the United States, residing at Kewanee, in the county of Henry and State of Illinois, have invented new and useful Improvements in Broadcast Seeders, of which the following is a specification.

This invention relates to a broadcast seeder and it consists in the novel features hereinafter described and claimed.

An object of the invention is to provide a seeder of the character indicated which may be attached to the frame of a cultivator or similar implement and which may be operated by the spokes of one of the wheels thereof, or any other moving part coming in contact with a lever provided upon the seeder whereby the broadcast action is attained.

With the above object in view the structure includes clamp members adapted to be applied to the frame of the cultivator and an arm pivotally mounted upon the said clamp members. Springs are provided for holding the arm in a normal position. A pipe is carried by the arm at a point beyond its pivot and the said pipe is provided at its discharge end with a downwardly inclined lip upon which the seed falls and from which it is cast. A lever is attached to the said pipe and is adapted to be engaged by the spokes of one of the supporting wheels of the cultivator or by any other moving part of the same, whereby the said arm and the pipe are turned against the tension of the springs which serve to hold them in normal position. A valve mechanism is mounted at the upper end of the pipe and may be regulated to adjust the quantity of seed which is permitted to flow through the pipe. A sack is carried at the upper end of the pipe and contains the seed and any suitable flexible element may be employed for connecting the upper portion of the sack with a part of the frame of the cultivator or the machine to which the attachment is applied.

In the accompanying drawing:—Figure 1 is a side elevation of the seeder showing the same applied to the frame of a cultivator. Fig. 2 is a similar view of the seeder observing the same at a right angle to the view shown in Fig. 1. Fig. 3 is a horizontal sectional view of the seeder. Fig. 4 is a detail view of the valve used upon the seeder for controlling the flow of seed.

The seeder comprises clamp members 1 which are provided with knuckles 2 pivotally connected together by means of a hinged bolt 3. Bolts 4 pass transversely through the free edge portions of the clamp members 1 and serve as means for securing the said clamp members upon the axle or other portion of the frame of the cultivator or other machine. Brackets 5 are carried by the clamp members 1 and the said brackets are spaced from each other. An arm 6 is pivotally mounted upon the bolt 3 between the knuckles 2 of the clamp members 1 and coil springs 7 are connected at their inner ends with the free end portion of the arm 6 and the said springs are connected at their outer ends with the end portions of the brackets 5. The springs 7 are under tension with a tendency to hold the arm 6 at a normal position which position is approximately midway between the ends of the brackets 5 as best shown in Fig. 3 of the drawing. A pipe 8 is carried by the arm 6 and the said pipe is provided at its delivery end with a downwardly inclined lip 9. A lever 10 is fixed to the pipe 8 at a point above the arm 6 and may be engaged by the spokes of the cultivator wheel which is indicated at 11 in Fig. 1 of the drawing.

A fitting 12 is mounted at the upper end of the pipe 8 and is provided with outstanding spaced ears 13. A disk 14 is pivotally mounted between the ears 13 and the said disk is provided at its other portion with a series of openings 15 which differ in diameter. When the disk 14 is turned any particular opening 15 may be brought into register with the upper end of the pipe 8. The disk 14 is further provided at its intermediate portion with a series of openings 16 and a screw 17 passes through the ears 13 and may pass through any particular opening 16 whereby one of the openings 15 is held in register with the upper end of the pipe 8. A seed bag 18 is mounted upon the fittings 12 and a flexible connection 19 may be provided for supporting the upper portion of the bag 18 from a part of the frame of the cultivator or the machine to which the attachment is applied.

In operation the bag 18 carries the seed and the disk 14 is adjusted so that an opening 15 of desired diameter is brought into register with the upper end of the pipe 8. As the cultivator moves over the ground the spokes of the wheel 11 successively engage the free end portion of the lever 10 whereby the lever is swung and the pipe 8 and arm 6 are turned upon the pivot bolt 3. In the meantime the seed gravitates down through the pipe 8 and deposits upon the lip 9 from which it is cast by the turning movement of the pipe just described. As soon as that spoke of the wheel 11 passes beyond the free end of the lever 10 the tension of the spring 7 comes into play whereby the arm 6 is swiftly moved back to a position approximately midway between the brackets 5 and thus the pipe 8 is turned with a quick movement which has the effect of casting the seed for a considerable distance from the inclined lip 9.

It is apparent that by adjusting the disk 14 over the upper end of the pipe 8 any particular opening 15 may be brought into register with the upper end of the said pipe and thus the volume of seed which flows from the bag 18 through the pipe 8 may be regulated.

While the device is shown and described as being applied to a cultivator it is to be understood that it may be applied to any other kind of agricultural machine and the lever 10 may be operated by the spokes of one of the supporting wheels or any other moving part of the machine.

From the foregoing description taken in conjunction with the accompanying drawing, it will be seen that a broadcast seeder attachment of simple and durable structure is provided and that the parts mutually coöperate with each other to effectually scatter the seed as the machine to which the attachment is applied is drawn over the surface of the soil.

Having described the invention what is claimed is:—

1. A broadcast seeder comprising a support, an arm pivotally mounted upon the support, spring means for holding the arm at a normal position, a pipe carried by the arm, a seed receptacle mounted upon the pipe and an outstanding lever mounted upon the pipe.

2. A broadcast seeder comprising a support, an arm pivoted upon the support, spring means for holding the arm at a normal position, a pipe carried by the arm, an inclined lip provided at the delivery end of the pipe, a seed receptacle carried by the pipe and a lever carried by the pipe.

3. A broadcast seeder comprising clamp members, means for securing the said members with relation to each other, brackets carried by the clamp members, an arm pivoted to the clamp members, springs connecting the arm with the brackets and tending to hold the arm at a normal position, a pipe carried by the arm, a seed receptacle mounted upon the pipe, and a lever mounted upon the pipe.

4. A seeder comprising clamp members, brackets carried by the clamp members, a pivot bolt connecting the clamp members together, an arm pivoted upon the said pivot bolt, spring means interposed between the brackets and the arm for holding the arm at a normal position, a pipe carried by the arm, a seed receptacle mounted upon the pipe and a lever mounted upon the pipe.

5. A seeder comprising a support, an arm pivoted upon the support, spring means for holding the arm at a normal position, a pipe carried by the arm, a lever carried by the pipe, a seed regulating valve carried by the pipe and a seed receptacle connected with the pipe through the said regulating means.

In testimony whereof we affix our signatures in presence of two witnesses.

WARREN T. HEAPS.
WILLIAM THACKERAY.

Witnesses:
 CARRIE LANG,
 JANE DOHERTY.

Copies of this patent may be obtained for five cents each, by addressing the "Commissioner of Patents, Washington, D. C."